US012769360B2

(12) United States Patent
Kim et al.

(10) Patent No.: US 12,769,360 B2
(45) Date of Patent: Oct. 20, 2026

(54) SLIDING TYPE ELECTRONIC DEVICE INCLUDING SPEAKER

(71) Applicant: Samsung Electronics Co., Ltd., Suwon-si (KR)

(72) Inventors: Bohyeon Kim, Suwon-si (KR); Wankyu Kim, Suwon-si (KR); Hyunsuk Kim, Suwon-si (KR); Byungwoo Min, Suwon-si (KR); Sangeun Lee, Suwon-si (KR); Joongyeon Cho, Suwon-si (KR); Junwoo Choi, Suwon-si (KR); Hyunggwang Kang, Suwon-si (KR); Baekeun Cho, Suwon-si (KR); Changryong Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 640 days.

(21) Appl. No.: 18/319,076

(22) Filed: May 17, 2023

(65) Prior Publication Data

US 2023/0288958 A1 Sep. 14, 2023

Related U.S. Application Data

(63) Continuation of application No. PCT/KR2021/014986, filed on Oct. 25, 2021.

(30) Foreign Application Priority Data

Nov. 17, 2020 (KR) ........................ 10-2020-0154044
Dec. 30, 2020 (KR) ........................ 10-2020-0188081

(51) Int. Cl.
*G06F 1/16* (2006.01)
*H04R 1/40* (2006.01)

(52) U.S. Cl.
CPC .......... *G06F 1/1624* (2013.01); *G06F 1/1652* (2013.01); *G06F 1/1688* (2013.01); *H04R 1/403* (2013.01); *H04R 2499/15* (2013.01)

(58) Field of Classification Search
CPC .... G06F 1/1624; G06F 1/1652; G06F 1/1688; H04R 1/403; H04R 2499/15
(Continued)

(56) References Cited

U.S. PATENT DOCUMENTS

2007/0071267 A1 3/2007 Kim
2013/0114840 A1 5/2013 Shin
(Continued)

FOREIGN PATENT DOCUMENTS

CN 111418001 A 7/2020
EP 3 322 160 A1 5/2018
(Continued)

OTHER PUBLICATIONS

Korean Office Action dated Apr. 29, 2025, issued in Korean Patent Application No. 10-2020-0188081.
(Continued)

*Primary Examiner* — Michael R Neff
(74) *Attorney, Agent, or Firm* — Jefferson IP Law, LLP

(57) ABSTRACT

A sliding type electronic device is provided. The sliding type electronic device includes a first housing, a second housing which includes a circuit board and which is slidable with respect to the first housing, a display in which a partial area of the second housing is arranged, a guide member which is arranged in the first housing, and which guides the rolling of the partial area of the display according to a sliding movement of the second housing, at least one speaker arranged inside the guide member, and a conductive connection
(Continued)

member which is arranged in the guide member so as to be wound or unwound, and which electrically connects the speaker to the circuit board.

15 Claims, 16 Drawing Sheets

(58) Field of Classification Search
USPC .......................................................... 455/575.4
See application file for complete search history.

(56) References Cited

U.S. PATENT DOCUMENTS

| | | | | |
|---|---|---|---|---|
| 2016/0337737 | A1* | 11/2016 | Kato | H04R 1/086 |
| 2017/0060183 | A1 | 3/2017 | Zhang et al. | |
| 2017/0161868 | A1* | 6/2017 | Kim | G09F 9/00 |
| 2017/0364119 | A1 | 12/2017 | Lee et al. | |
| 2018/0198899 | A1 | 7/2018 | Lee | |
| 2018/0275770 | A1 | 9/2018 | Kang et al. | |
| 2019/0261519 | A1* | 8/2019 | Park | H04M 1/0235 |
| 2019/0326718 | A1* | 10/2019 | Zhang | H01R 39/10 |
| 2020/0076940 | A1 | 3/2020 | Kim et al. | |
| 2020/0107458 | A1 | 4/2020 | Park | |
| 2020/0402434 | A1* | 12/2020 | Yamazuki | G09G 3/035 |
| 2022/0279666 | A1 | 9/2022 | Park et al. | |

FOREIGN PATENT DOCUMENTS

| | | | |
|---|---|---|---|
| JP | 2012-34120 | A | 2/2012 |
| KR | 10-2006-0032195 | A | 4/2006 |
| KR | 10-0651520 | B1 | 11/2006 |
| KR | 10-0677500 | B1 | 2/2007 |
| KR | 10-0805979 | B1 | 2/2008 |
| KR | 10-2008-0063495 | A | 7/2008 |
| KR | 10-2016-0011718 | A | 2/2016 |
| KR | 10-2016-0136587 | A | 11/2016 |
| KR | 10-2017-0006089 | A | 1/2017 |
| KR | 10-1720104 | B1 | 3/2017 |
| KR | 10-2017-0038308 | A | 4/2017 |
| KR | 10-2017-0090295 | A | 8/2017 |
| KR | 10-2017-0141438 | A | 12/2017 |
| KR | 10-1910839 | B1 | 10/2018 |
| KR | 10-2019-0101184 | A | 8/2019 |
| KR | 10-2020-0036409 | A | 4/2020 |
| KR | 10-2020-0091837 | A | 7/2020 |
| KR | 10-2266152 | B1 | 6/2021 |

OTHER PUBLICATIONS

International Search Report dated Feb. 18, 2022, issued in International Patent Application No. PCT/KR2021/014986.
Extended European Search Report dated Feb. 23, 2024, issued in European Patent Application No. 21894918.8.
Korean Office Action dated Jan. 23, 2026, issued in Korean Patent Application No. 10-2020-0188081.

* cited by examiner

SLIDING TYPE ELECTRONIC DEVICE INCLUDING SPEAKER

CROSS-REFERENCE TO RELATED APPLICATION(S)

This application is a continuation application, claiming priority under § 365(c), of an International application No. PCT/KR2021/014986, filed on Oct. 25, 2021, which is based on and claims the benefit of a Korean patent application number 10-2020-0154044, filed on Nov. 17, 2020, in the Korean Intellectual Property Office, and of a Korean patent application number 10-2020-0188081, filed on Dec. 30, 2020, in the Korean Intellectual Property Office, the disclosure of each of which is incorporated by reference herein in its entirety.

BACKGROUND

1. Field

The disclosure relates to an arrangement of speakers of a sliding-type electronic device.

2. Description of Related Art

Two types of speakers may be arranged in an electronic device such as a smartphone. For example, one speaker may be disposed at a bottom end of the electronic device to serve as a main speaker, and the other speaker may be disposed at an upper end of a front surface of the electronic device to serve as a receiver for transmitting call voice.

The speaker disposed at a lower end (i.e., the bottom end) of the electronic device is a closed-type speaker and may include an enclosure structure in itself. Such an enclosure structure may play a role in preventing air pressure generated during an operation of the speaker from spreading out to the outside. The enclosure structure of the speaker may play an important role in speaker acoustic performance, and the larger the volume of the enclosure, the better the sound in the low-frequency band.

Meanwhile, the speaker disposed at a top end (i.e., the upper end) of the front surface of the electronic device is an open-type speaker and does not have an enclosure structure. Thus, a separate enclosure structure may be required. For example, an open-type speaker may use a partial space inside an electronic device as an enclosure structure.

The above information is presented as background information only to assist with an understanding of the disclosure. No determination has been made, and no assertion is made, as to whether any of the above might be applicable as prior art with regard to the disclosure.

SUMMARY

However, when an electronic device is a sliding-type electronic device, for example, an electronic device that includes a first housing and a second housing, and the second housing slides from the first housing, since a driver (driving unit) configured to provide sliding movement is disposed in the first housing, it may be difficult to arrange speakers due to lack of space to place the speakers.

Aspects of the disclosure are to address at least the above-mentioned problems and/or disadvantages and to provide at least the advantages described below. Accordingly, an aspect of the disclosure is to provide an electronic device in which a speaker may be arranged by using an inner space of a driver disposed in a housing as an enclosure.

Another aspect of the disclosure is to provide an electronic device in which stereo-speakers may be arranged by using an inner space of a driver disposed in a housing as an enclosure.

Another aspect of the disclosure is to provide an electronic device in which stereo-type speakers may be arranged by using an inner space of a guide member disposed in a housing as an enclosure.

Additional aspects will be set forth in part in the description which follows and, in part, will be apparent from the description, or may be learned by practice of the presented embodiments.

In accordance with an aspect of the disclosure, an electronic device is provided. The electronic device includes a first housing, a second housing including a circuit board and configured to be slidable with respect to the first housing, a display on which a partial area of the second housing is disposed, a guide member disposed in the first housing and configured to guide rolling of a partial area of the display in response to a sliding of the second housing, one or more speakers disposed inside the guide member, and a conductive connecting member disposed on the guide member to be wound or unwound and electrically connecting the speakers to the circuit board.

In accordance with another aspect of the disclosure, an electronic device is provided. The electronic device includes a housing, a driver disposed in the housing, and one or more speakers coaxially disposed within the driver and configured to use an inner space of the driver as an enclosure acoustic resonance space.

According to various embodiments of the disclosure, in an electronic device, an inner space of a driver disposed in a housing used is as an enclosure for a speaker so that a space required for disposing a speaker can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
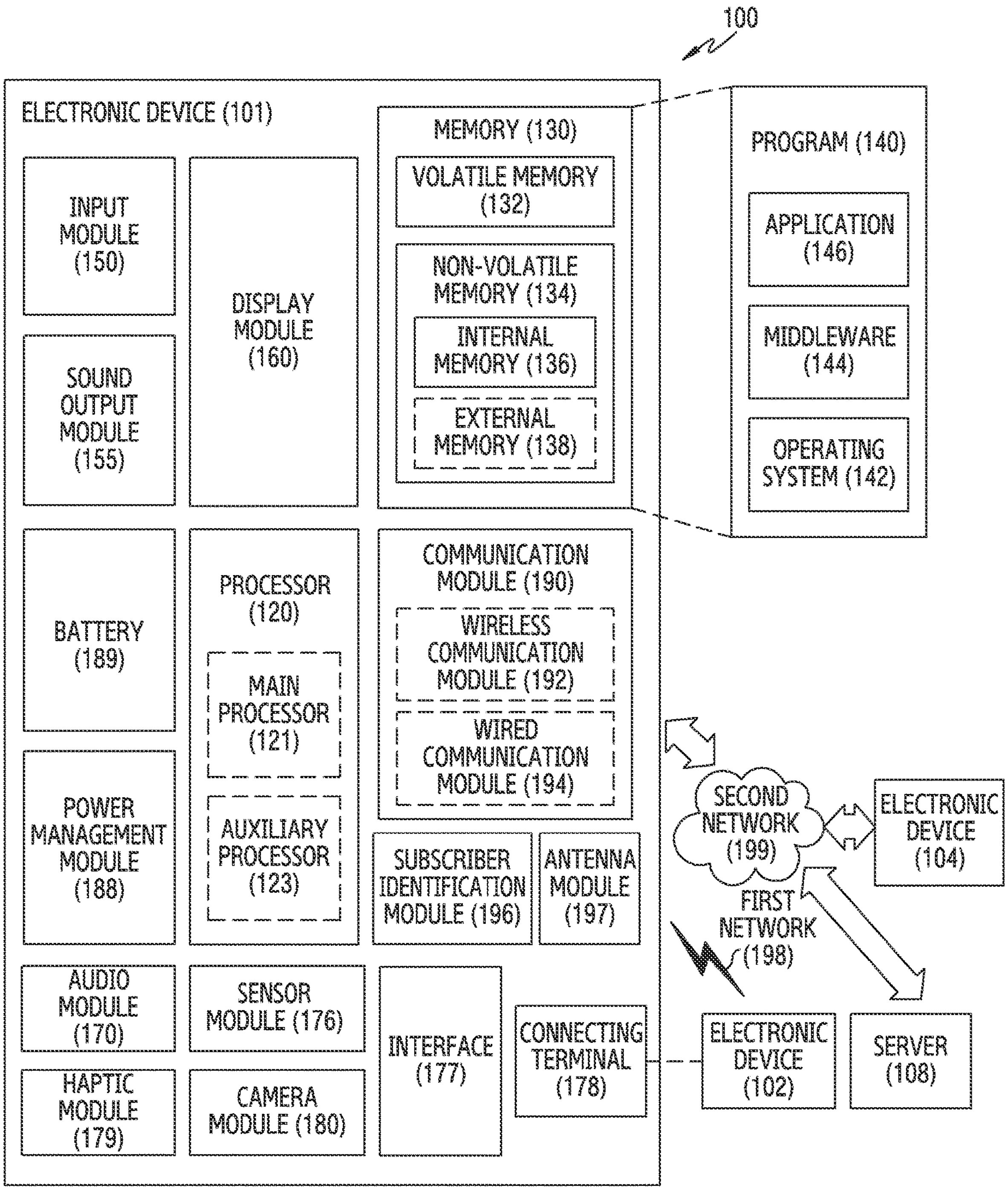
FIG. 1 is a block diagram illustrating an electronic device 101 in a network environment 100 according to an embodiment of the disclosure.

FIG. 1 is a block diagram illustrating an electronic device 101 in a network environment 100 according to an embodiment of the disclosure.

Referring to FIG. 1, an electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to one embodiment, the electronic device 101 may communicate with the electronic device 104 via the server 108. According to another embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In other embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may be configured to execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, a communication processor (CP), and the like) that is operable independently from, or in conjunction with, the main processor 121. Additionally or alternatively, the auxiliary processor 123 may be adapted to consume less power than the main processor 121, or to be specific to a specified function. According to yet another embodiment, the auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). In an embodiment, the auxiliary processor 123 (e.g., an image signal processor or a communication processor) may be implemented as part of another component (e.g., the camera module 180 or the communication module 190) functionally related to the auxiliary processor 123.

The memory 130 may be configured to store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 or an external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. In another embodiment, the input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. In an embodiment, the receiver may be implemented as separate from, or as part of the speaker.

The display device 160 may visually provide information to the outside (e.g., a user) of the electronic device 101. In an embodiment, the display device 160 may include, for example, a display, a hologram device, or a projector and control circuitry to control a corresponding one of the display, hologram device, and projector. According to another embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 177 may support one or more specified protocols to be used for the electronic device 101 to be coupled with the external electronic device (e.g., the electronic device 102) directly (e.g., wiredly) or wirelessly. In an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). In another embodiment, the connecting terminal 178 may include, for example, a HDMI connector, a USB connector, an SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to another embodiment, the haptic module 179 may include, for example, a motor, a piezoelectric element, or an electric stimulator.

The camera module 180 may capture a still image or moving images. In an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. In another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. In an embodiment, the wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. In another embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

In an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to another embodiment, all or some of operations to be executed at the electronic device 101 may be executed at one or more of the external electronic devices 102, 104, or 108. In an example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. In an embodiment, the electronic device 101 may provide the outcome, with or without further processing of the outcome, as at least part of a reply to the request. To that end, a cloud computing, distributed computing, or client-server computing technology may be used, for example.

Figure 2:
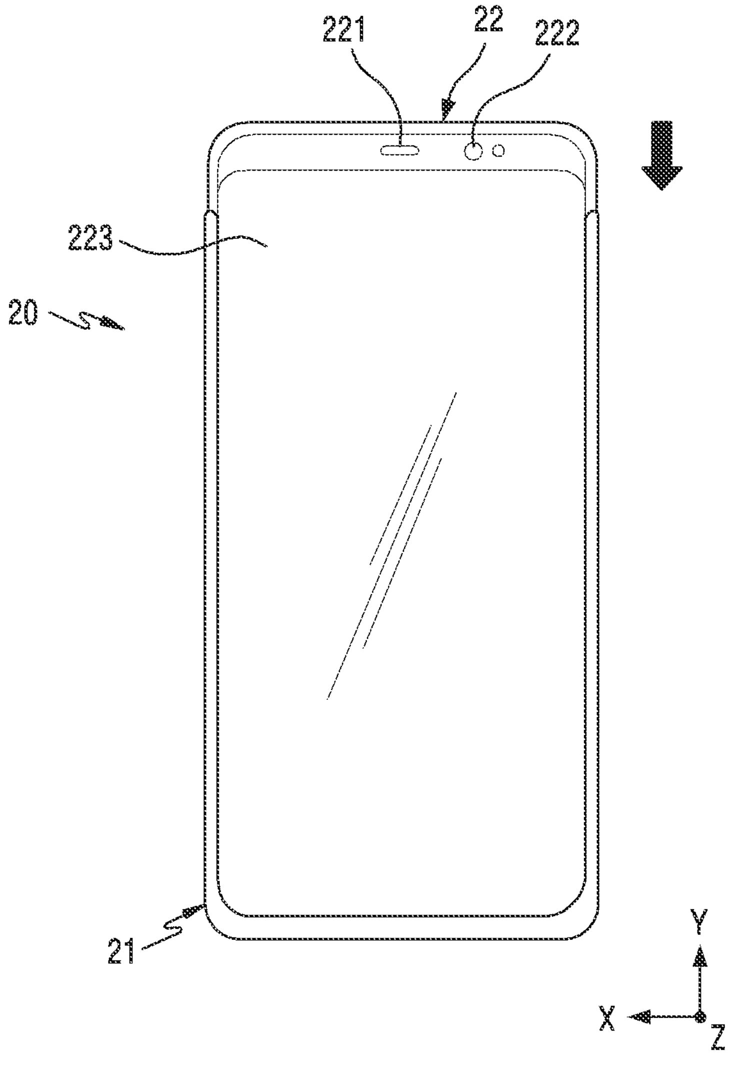
FIG. 2 is a plan view illustrating an electronic device in a slide-in state according to an embodiment of the disclosure.

FIG. 2 is a plan view illustrating an electronic device in a slide-in state according to an embodiment of the disclosure.

Figure 3:
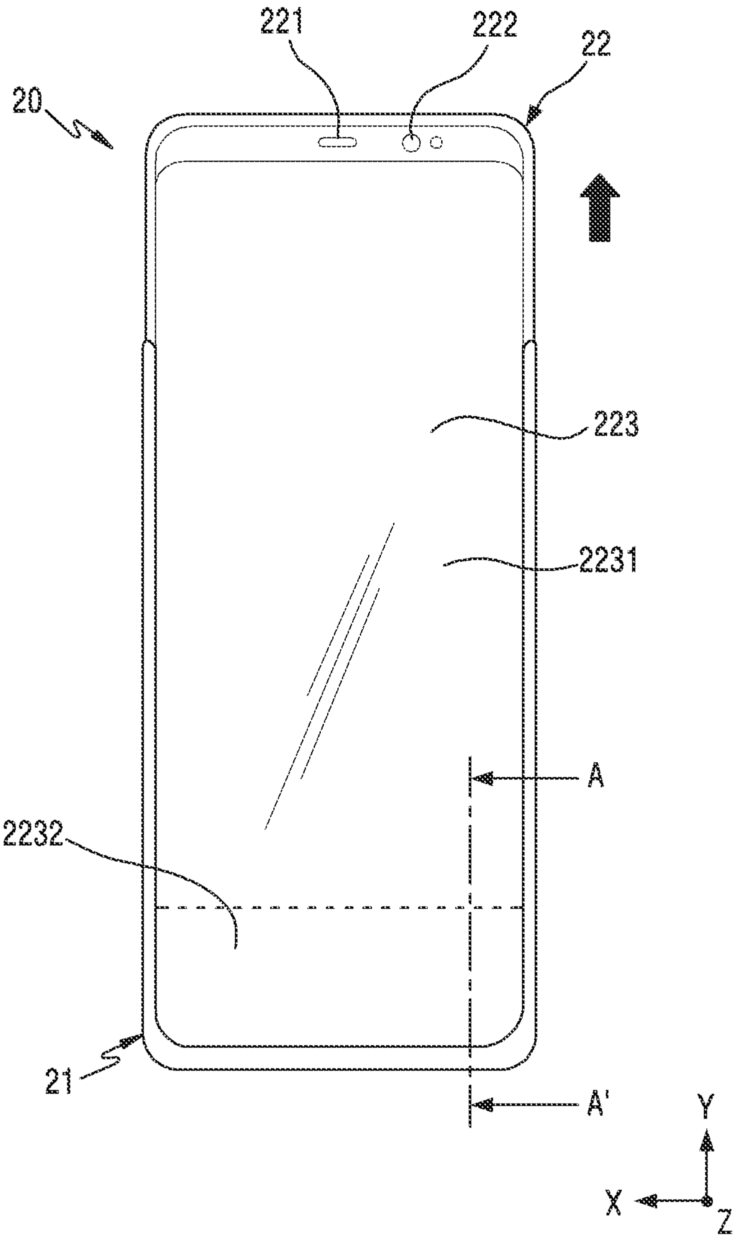
FIG. 3 is a plan view illustrating the electronic device in a slide-out state according to an embodiment of the disclosure.

FIG. 3 is a plan view illustrating the electronic device in a slide-out state according to an embodiment of the disclosure.

Referring to FIGS. 2 and 3, according to an embodiment, an electronic device 20 may be substantially the same as the electronic device illustrated in FIG. 1. In an embodiment, the electronic device may include a smartphone, a tablet personal computer (PC), a mobile phone, an image phone, an e-book reader, a desktop personal computer (PC), a laptop personal computer (PC), a netbook computer, a workstation, a server, a personal digital assistant (PDA), a portable multimedia player (PMP), an moving picture experts group (MPEG-1 or MPEG-2) audio layer 3 (MP3) player, a mobile medical device, a camera, or a wearable device (e.g., smart eyeglasses, a head-mounted-device (HMD), an electronic cloth, an electronic bracelet, an electronic necklace, an electronic accessory, an electronic tattoo, a smart mirror, or a smart watch).

In another embodiment, the electronic device 20 is a sliding-type electronic device 20 and may include a first housing 21 and a second housing 22. For example, the first housing 21 may include a first frame, a first cover, or a first case. For example, the second housing 22 may include a second frame, a second cover, or a second case.

In yet another embodiment, in the electronic device 20, the second housing 22 may perform a slide-in (e.g., a closed mode) or slide-out (e.g., an opened mode) operation in the first housing 21. For example, the second housing 22 may be slid manually, automatically, or semi-automatically. In another example, in the case where the sliding method is semi-automatic, when the second housing 22 is slid by a predetermined range or more by a user, the second housing 22 may be slid by an elastic sliding guide member. As still another example, in the case where the sliding method is automatic, when a driver is capable of including at least one motor, the second housing 22 may be slid by the power of the motor. As yet another example, when the sliding method is manual, the second housing 22 may be slid by a user's force.

According to one embodiment, the second housing 22 may be slid into or slid out of the first housing 21 by means of a guide member. According to another embodiment, the second housing 22 may be slid in or out in the state of facing the first housing 21.

According to yet another embodiment, the second housing 22 may be slid in or slid out along the longitudinal direction of the first housing 21 (e.g., the Y-axis direction). According to still another embodiment, the second housing 22 may include at least some of a first speaker module 221, a camera 222, and a flexible display 223. The first speaker module 221, for example, a receiver, may be disposed at the upper end of the second housing 22 (e.g., in the Y-axis direction). In an example, the camera 222 may be disposed adjacent to the first speaker module 221. In another example, the first speaker module 221 or the camera 222 may be located under the flexible display 223 (e.g., in the −Z-axis direction).

In an embodiment, the camera 222 may be disposed to be exposed through the flexible display 223. For example, the camera 222 may be disposed in the inner space of the electronic device 20 to be in contact with the external environment through an opening perforated in the flexible display 223 or a transmission area. In another embodiment, the area where the flexible display 223 and the camera 222 face each other is a portion of a content display area and may be configured as a transmission area having a predetermined transmittance. In yet another embodiment, the transmission area may have a transmittance ranging from about 5% to about 20%. The transmission area may include an area overlapping an effective area (e.g., a field of view area) of the camera 222 through which light imaged by an image sensor to generate an image passes. In an example, the transmission area of the flexible display 223 may include an area having a lower pixel density than the periphery. In another example, the transmission area may replace the opening. In yet another example, the camera 222 may include an under display camera (UDC).

According to one embodiment, a visually visible display area of the flexible display 223 may be expanded according to the slide-out operation. According to another embodiment, a portion of the flexible display 223 may be moved into the first housing 21 or moved out of the first housing 21 by the guide member.

According to yet another embodiment, the display area of the flexible display 223 may include a first display area 2231 that is always exposed and a second display area 2232 that is variable depending on the slide-in or slide-out of the second housing 22. According to still another embodiment, the second display area 2232 may be a display area expanded in response to the slide-out of the second housing 22.

Figure 4:
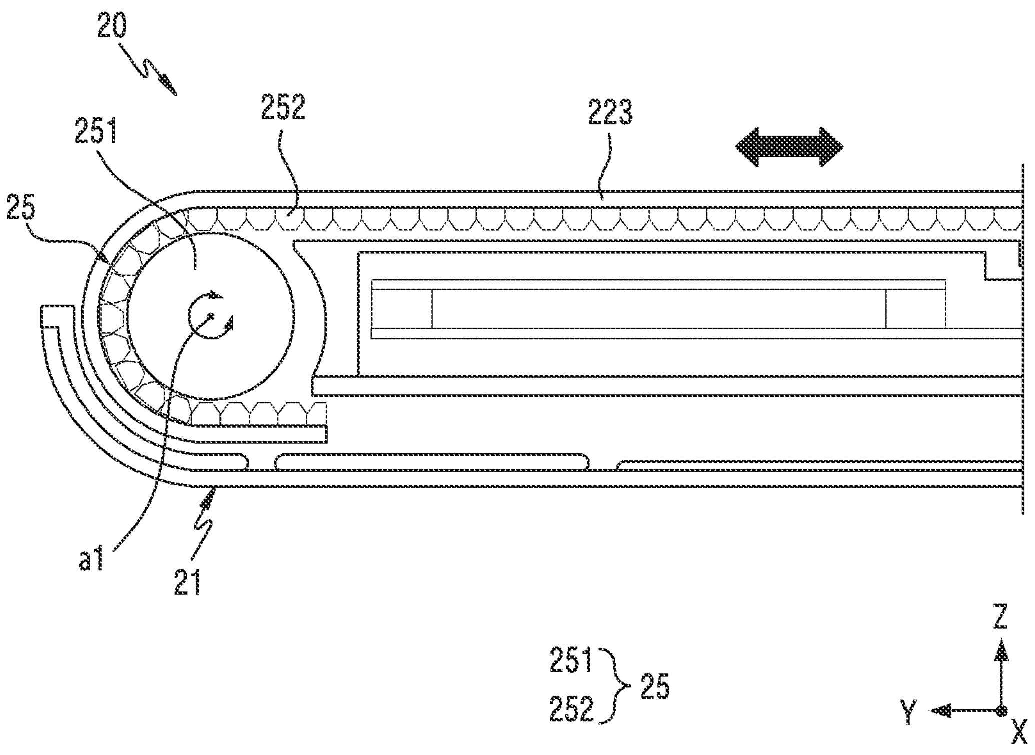
FIG. 4 is a cross-sectional view taken along the line A-A' of FIG. 3 according to an embodiment of the disclosure.

FIG. 4 is a cross-section view taken along the line A-A' of FIG. 3 according to an embodiment of the disclosure.

Referring to FIG. 4, in an electronic device 20 according to an embodiment, a second housing 22 may slide into or slide out of a first housing 21. While the second housing 22 slides on the first housing 21, a guide member 25 may guide the winding or unwinding of a flexible display 223.

In an embodiment, the guide member 25 may be a single member or may be configured through assembly of multiple members. In another embodiment, the guide member 25 may include a roller 251 and a multi-bar support 252. In yet another embodiment, when the second housing (e.g., the second housing 22 illustrated in FIG. 3) automatically slides in or slides out, a drive motor (not illustrated) may be further included. In still another embodiment, the guide member 25 may include a roller 251 configured to support at least a portion of the flexible display 223 and to be capable of guiding the movement of the multi-bar support 252 so that the flexible display 223 may be at least partially moved.

According to one embodiment, the roller 251 has a cylindrical shape and may be rotated by the sliding of the second housing (e.g., the second housing 22 illustrated in FIG. 3). According to another embodiment, the guide member 25 may include a multi-bar support 252 disposed on the outer circumferential surface of the roller 251 to be engaged with the roller 251. According to yet another embodiment, at least a portion of the multi-bar support 252 may be connected to the roller 251 and may be moved out of the first housing 21 or moved into the first housing 21 according to the rotation of the roller 251. The multi-bar support 252 may support the flexible display 223 during a slide-in or slide-out operation of the second housing (e.g., the second housing 22 illustrated in FIG. 3).

According to an embodiment, the roller 251 may include at least one speaker. According to another embodiment, the roller 251 may have a cylindrical shape including a through hole, and at least one speaker may be disposed inside the through hole.

Figure 5:
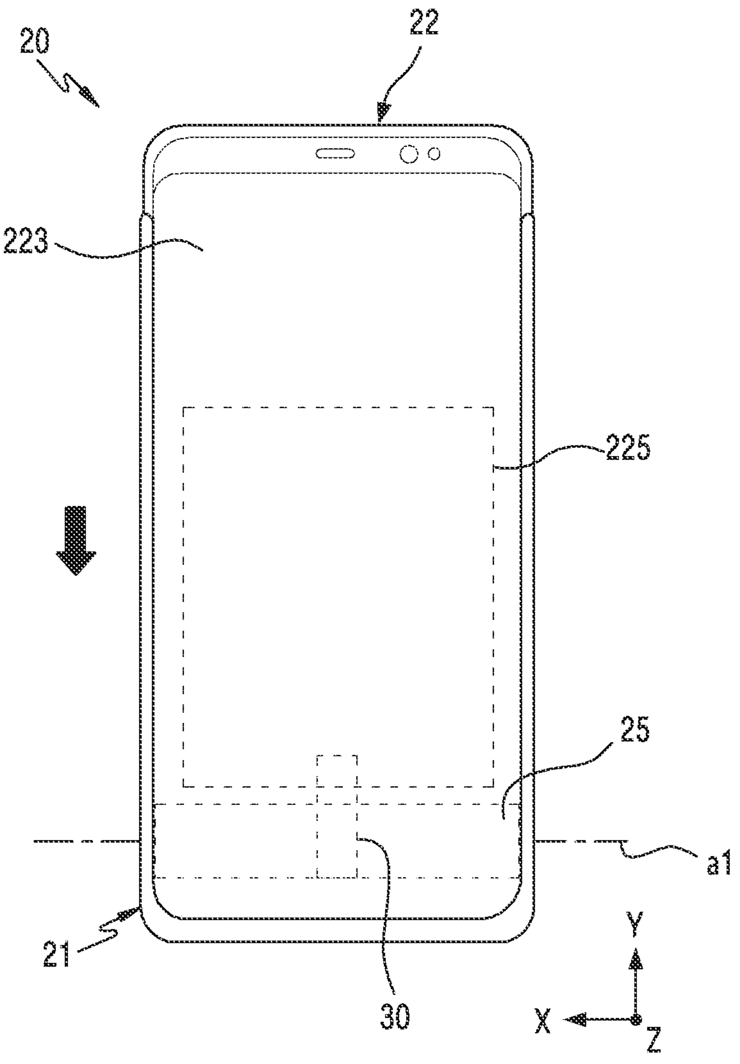
FIG. 5 is a plan view illustrating a state in which a conductive connecting member is wound in the electronic device in the slide-in state according to an embodiment of the disclosure.

FIG. 5 is a plan view illustrating a state in which at least a portion of a conductive connecting member is wound around a roller in the electronic device in the slide-in state according to an embodiment of the disclosure.

Figure 6:
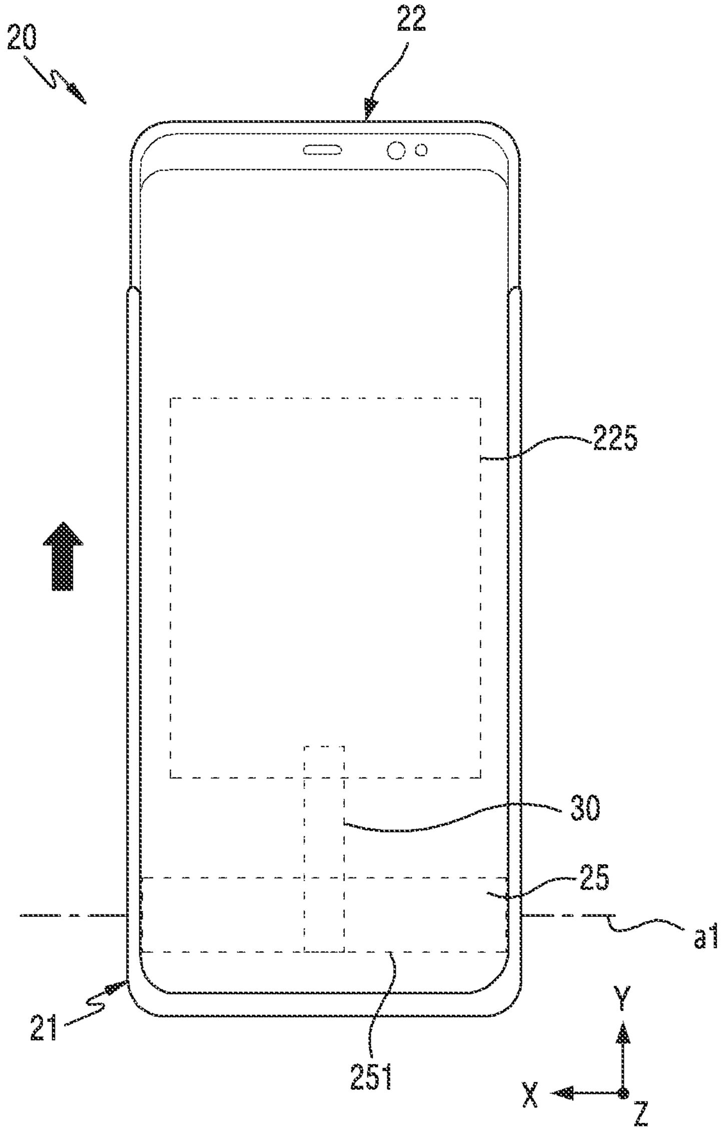
FIG. 6 is a plan view illustrating the conductive connecting member unwound in the electronic device in the slide-out state according to an embodiment of the disclosure.

FIG. 6 is a plan view illustrating at least a portion of the conductive connecting member unwound from the roller in the electronic device in the slide-out state according to an embodiment of the disclosure.

Referring to FIGS. 5 and 6, according to one embodiment, a guide member 25 may be disposed at a lower end of a first housing 21 (e.g., in the −Y axis direction). According to another embodiment, a second housing 22 may include a circuit board 225. According to yet another embodiment, the circuit board 225 may move together with the second housing 22 to move away from the guide member 25 according to the slide-out of the second housing 22 and may come close to the guide member 25 by the slide-in of the second housing 22. According to still another embodiment, the circuit board 225 and the guide member 25 may be electrically connected to each other by a conductive connecting member 30. The conductive connecting member 30 may be unwound from a roller 251 included in the guide member 25 by the slide-out of the second housing 22 or may be partially wound around the roller 251 by the slide-in of the second housing 22. For example, depending on the sliding of the second housing 22, at least a portion of the conductive connecting member 30 may be curved, bent, rolled, or wound.

In an embodiment, the roller 251 of the guide member 25 may be disposed at the lower end of the first housing 21 to be rotatable about a rotary axis al. In another embodiment, the roller 251 may be disposed to be oriented in a direction (e.g., the X-axis direction) substantially perpendicular to the sliding direction (e.g., the Y-axis direction) of the second housing 22.

In yet another embodiment, the conductive connecting member 30 may include a flexible printed circuit board (FPCB) or a cable. The conductive connecting member 30 may, for example, be electrically connected to at least one speaker (not illustrated) included in the roller 251.

Figure 7:
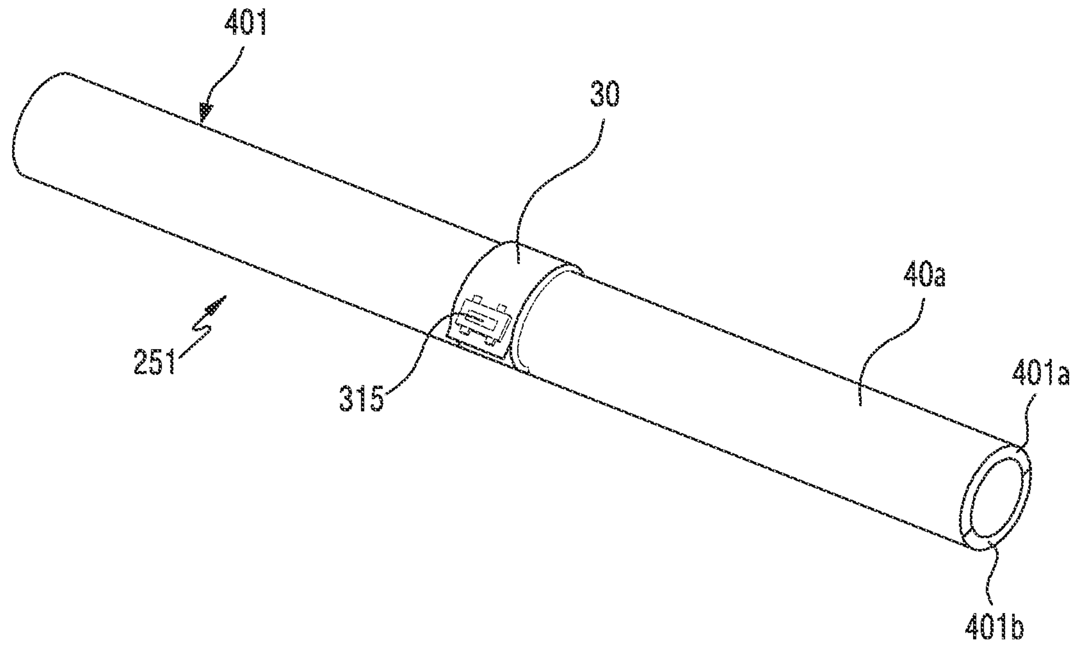
FIG. 7 is a perspective view illustrating a roller including a conductive connecting member wound therearound according to an embodiment of the disclosure.

FIG. 7 is a perspective view illustrating the conductive connecting member wound around the roller according to an embodiment of the disclosure.

Figure 8:
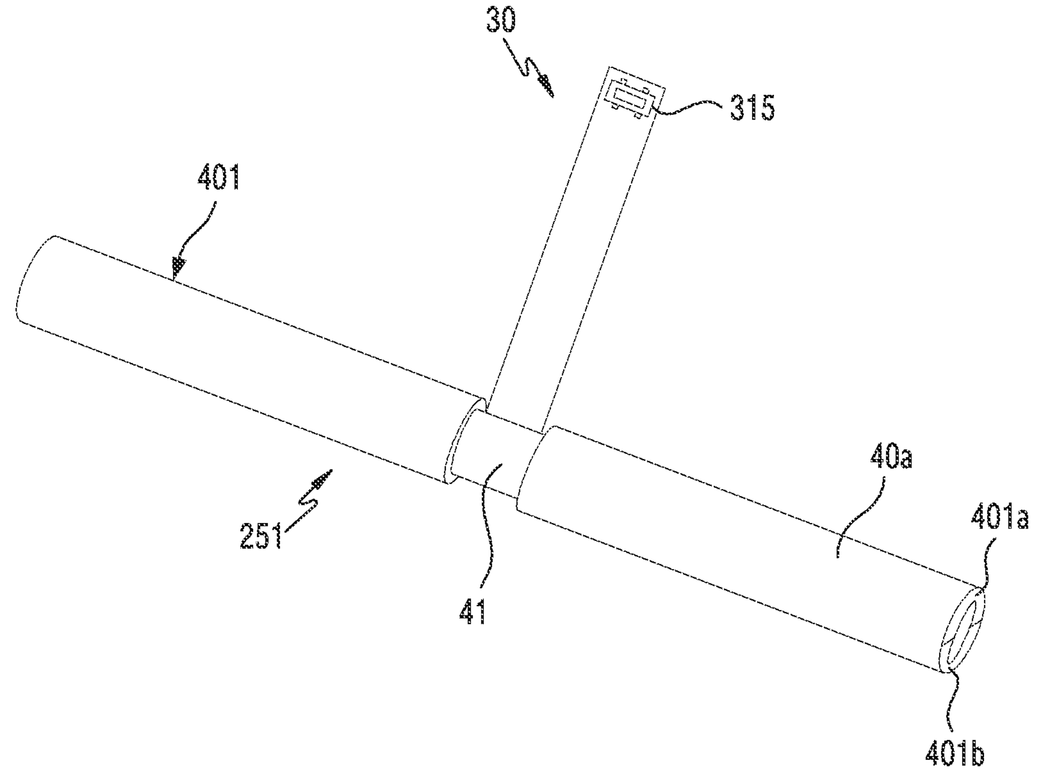
FIG. 8 is a perspective view illustrating the roller including a conductive connecting member unwound therefrom according to an embodiment of the disclosure.

FIG. 8 is a perspective view illustrating the conductive connecting member unwound from the roller according to an embodiment of the disclosure.

Referring to FIGS. 7 and 8, according to an embodiment, a roller 251 has a substantially cylindrical shape and may be disposed in the first housing (e.g., a first housing 21 illustrated in FIG. 5) to be rotatable about a first rotary axis (e.g., a rotary axis al illustrated in FIG. 5). According to another embodiment, the roller 251 does not need to be limited to the cylindrical shape, and may have a semi-cylindrical shape or may be configured in a column type having any polygonal cross section.

In an embodiment, the roller 251 may include a roller housing 401 and one or more speakers disposed in the inner space of the roller housing 401. In another embodiment, the roller housing 401 may include a groove 41 so that the conductive connecting member 30 is wound on the outer circumferential surface 40*a*. In yet another embodiment, the groove 41 has been illustrated as being formed in the middle portion of the roller housing 401, but it is not necessary to be limited to this formation position. The groove 41 may be provided close to one side or the other side of the roller housing 401. In still another embodiment, the groove 41 is recessed to a predetermined depth and may be provided in a ring shape. The groove 41 may be configured such that, when the electronic device (e.g., the electronic device 20 illustrated in FIG. 5) is in the slide-in state and the conductive connecting member 30 is wound around the roller 251, the height of the wound conductive connecting member 30 is not higher than the outer circumferential surface 40*a*.

The roller housing 401 is cylindrical, and its inner space may, for example, be used as an enclosure acoustic resonance space of the speakers.

According to one embodiment, the conductive connecting member 30 may include a connector 315 to be connected to the circuit board 225.

For example, when an electronic device (e.g., the electronic device 20 illustrated in FIG. 5) is in the slide-in state, at least a portion of the conductive connecting member 30 may be wound around the groove 41 of the roller 251 as illustrated in FIG. 7. When the electronic device 20 is in the sliding-out state, at least a portion of the conductive connecting member 30 may, for example, be unwound from the roller 251 as illustrated in FIG. 8.

Figure 9A:
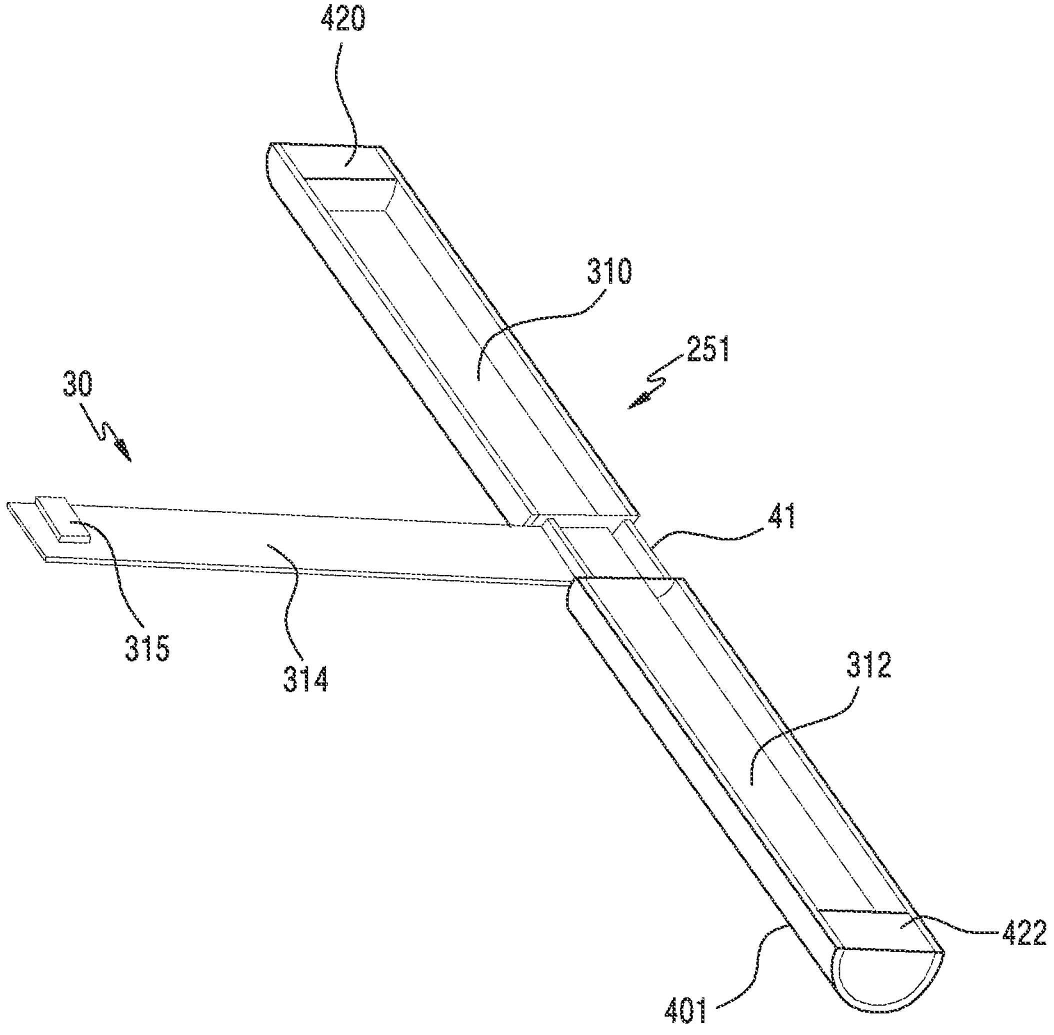
FIG. 9A is a partially cut-away perspective view illustrating a cut roller according to an embodiment of the disclosure.
Figure 9B:
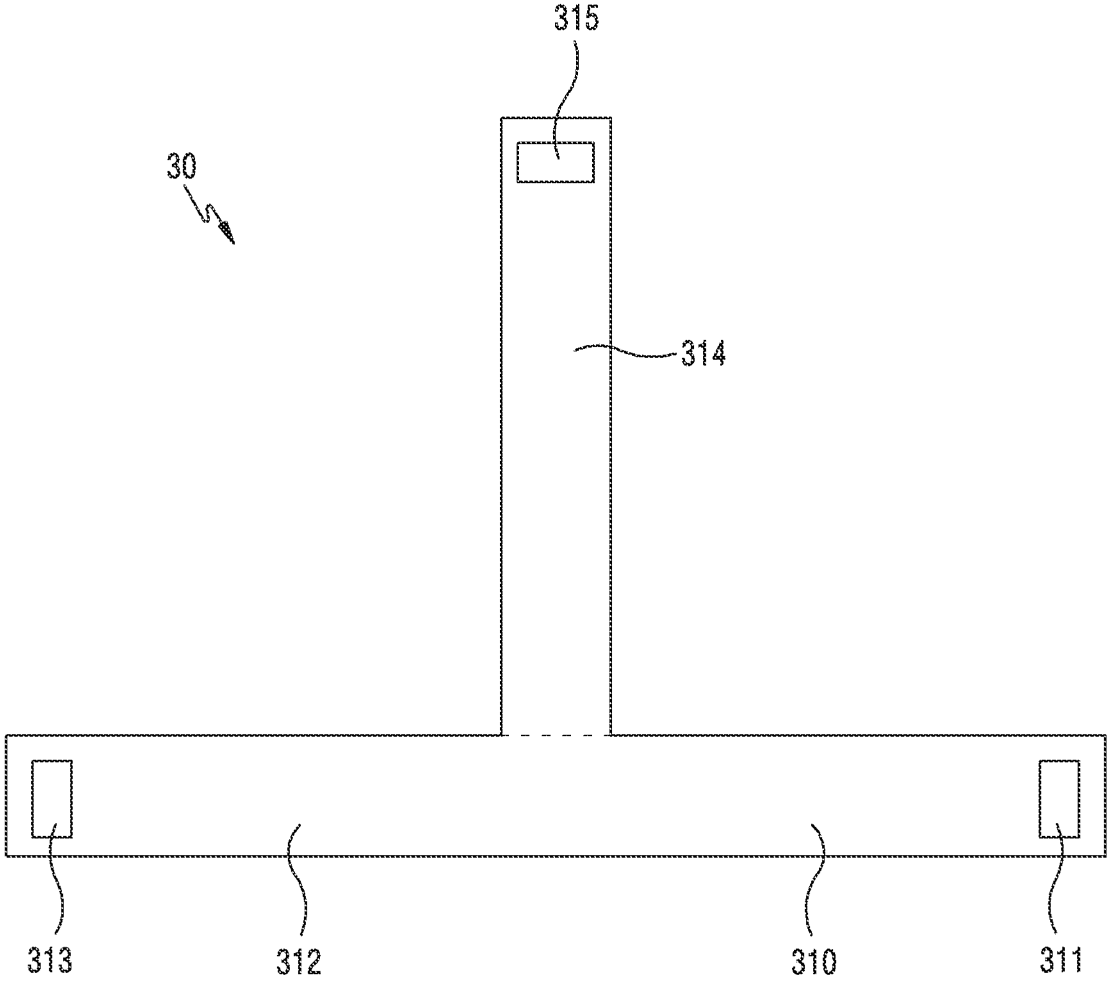
FIG. 9B is a plan view illustrating the conductive connecting member according to an embodiment of the disclosure.

FIG. 9A is a partially cut-away perspective view illustrating a cut roller according to an embodiment of the disclosure. FIG. 9B is a plan view illustrating the conductive connecting member according to an embodiment of the disclosure.

Referring to FIGS. 9A and 9B, according to an embodiment, a conductive connecting member 30 (a flexible printed circuit board (FPCB)) is a connecting member that may be wound around or unwound from a groove 41 of a roller housing 401 and may include a first portion 310, 312 disposed inside the roller housing 401 and a second portion 314 disposed outside the roller housing 401. According to an embodiment, the first portion 310, 312 may include a $(1\text{-}1)^{th}$ portion 310 or a $(1\text{-}2)^{th}$ portion 312.

According to one embodiment, one end of the first portion 310, 312 may be disposed at one side of the roller housing 401 and the other end may be disposed on the other side of the roller housing 401. According to another embodiment, the second portion 314 branches from the first portion 310, 312 and may extend in a direction substantially perpendicular to the first portion 310, 312 at approximately the midpoint of the first portion 310, 312. The branching point of the second portion 314 does not need to be limited to the middle portion of the first portion 310, 312. The branching point of the second portion 314 may be located at a place close to one end or the other end of the roller housing.

In an embodiment, the roller housing 401 may include a first roller housing portion (e.g., the first roller housing portion 401*a* illustrated in FIGS. 7 and 8) or a second roller housing portion (e.g., the second roller housing portion 401*b* illustrated in FIGS. 7 and 8), and be configured as a coupling structure of the first roller housing portion (e.g., the first roller housing portion 401*a* illustrated in FIGS. 7 and 8) or the second roller housing part (e.g., the second roller housing portion 401*b* illustrated in FIGS. 7 and 8). For example, after the first portion 310, 312 of the conductive connecting member 30 are disposed in the first roller housing portion, the second roller housing portion may be coupled, and the inner space may be sealed by a sealing structure such that the inner space may be used as an enclosure space for a speaker.

In another embodiment, a first speaker 420 or a second speaker 422 may be disposed on each of opposite sides of the roller 251 with reference the groove 41 of the roller housing 401. In yet another embodiment, the first speaker 420 and the second speaker 422 may emit sound in opposite directions, respectively. The roller 251 may have a structure in which the inner space in which the first speaker 420 is located and the inner space in which the second speaker 422 is located are isolated from each other.

According to one embodiment, the conductive connecting member 30 may include one or more connectors 311, 313, and 315. According to another embodiment, the conductive connecting member 30 may include a first connector 311 disposed in the $(1\text{-}1)^{th}$ portion 310 and connected to the first speaker 420, a second connector 311 disposed in the $(1\text{-}2)^{th}$ portion 312 and connected to the second speaker 422, and a third connector 311 disposed in the second portion 314 and connected to the circuit board 225.

According to still another embodiment, when only the first speaker 420 is disposed in the roller 251, the $(1\text{-}2)^{th}$ portion 312 of the first portion 310, 312 may be omitted and only the $(1\text{-}1)^{th}$ portion 310 may be included.

Figure 10:
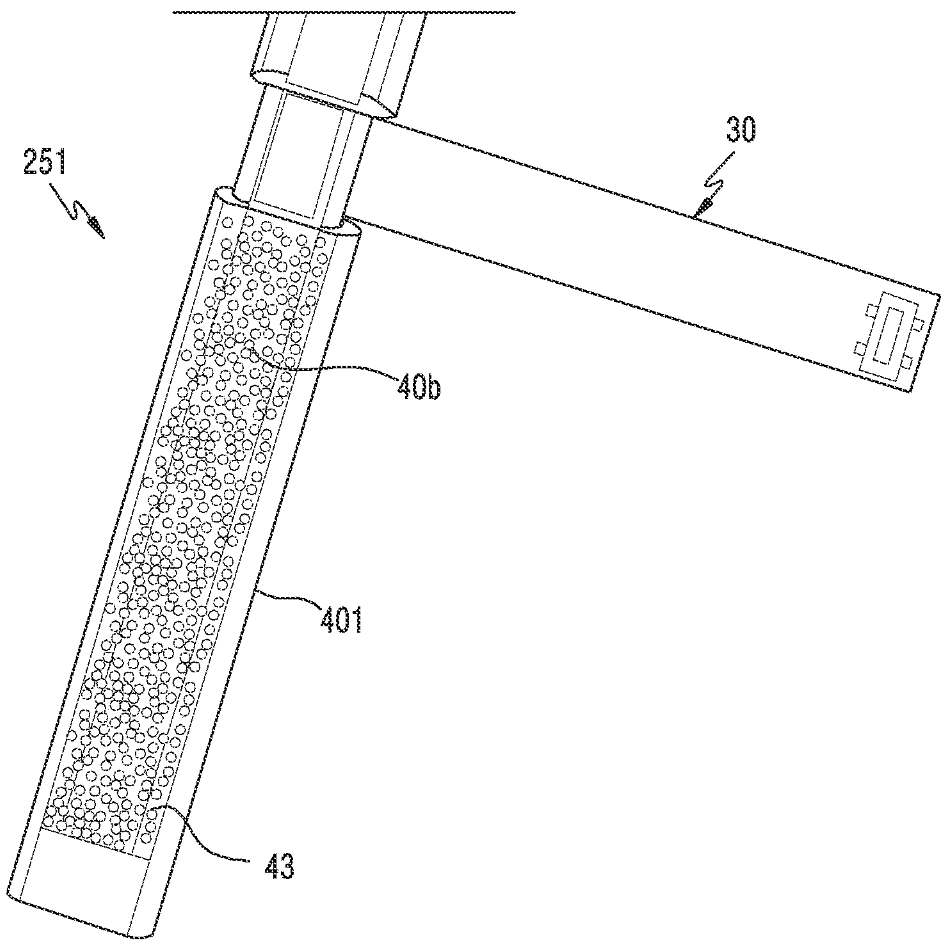
FIG. 10 is a partially cut-away perspective view illustrating a state in which a sound absorbing material fills the inner space of the roller according to an embodiment of the disclosure.

FIG. 10 is a partially cut-away perspective view illustrating a state in which a sound absorbing material fills the inner space of the roller according to an embodiment of the disclosure.

Referring to FIG. 10, in a roller 251 according to an embodiment, a sound absorbing material 43 may fill an inner space 40*b* of a roller housing 401. In an example, the sound absorbing material 43 may partially fill or entirely fill the inner space 40*b* of the roller 251. According to another embodiment, the sound absorbing material 43 absorbs sound waves to reduce the magnitude of sound and vibration, thereby improving low-pitched sound characteristics. In an example, the sound absorbing material 43 may include a foamed resin material such as a sponge. In an embodiment, the sound absorbing material 43 may partially or entirely fill the inside of the roller 251 in the form of multiple fine grains.

In an embodiment, the sound absorbing material 43 may at least partially or entirely fill the space where the first speaker 420 is located or the space where the second speaker 422 is located.

FIGS. 11A, 11B, 11C, and 11D are views illustrating speakers arranged in the roller according to various embodiments of the disclosure.

Referring to FIGS. 11A to 11D, in the roller according to one embodiment, one or more speakers may be disposed at various positions.

Figure 11A:
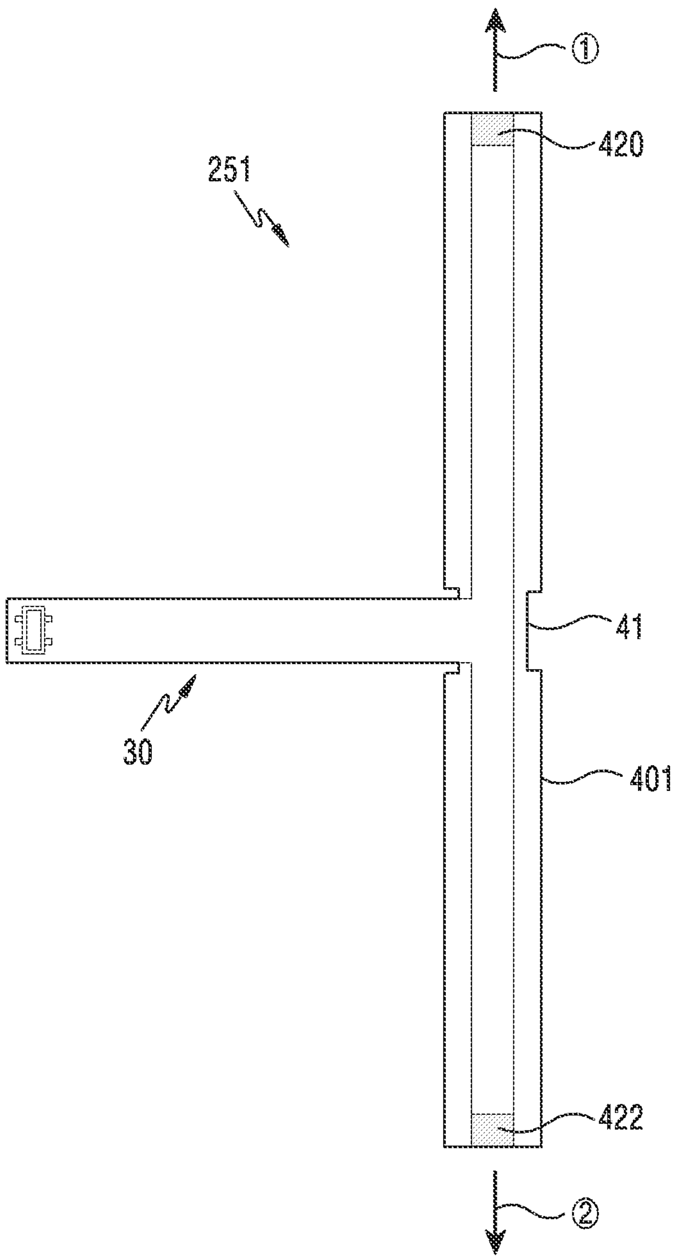
FIGS. 11A, 11B, 11C, and 11D are views illustrating respectively speakers arranged in the roller according to various embodiments of the disclosure.

Referring to FIG. 11A, the speakers disposed in a roller 251 according to an embodiment may include a first speaker 420 or a second speaker 422 disposed in a roller housing 401. For example, the first speaker 420 or the second speaker 422 may include a coin-type speaker.

In an embodiment, the first speaker 420 may be disposed to emit sound in a first direction ① oriented to be substantially perpendicular to the sliding direction of the second housing (e.g., the second housing 22 illustrated in FIG. 6), and the second speaker 422 may be disposed to emit sound in a second direction ② oriented opposite to the first direction ①. According to another embodiment, the first speaker 420 and the second speaker 422 may be arranged to be symmetrical to each other. According to still another embodiment, the first speaker 420 may use the inner space at one side of the roller housing 401 as an acoustic resonance space, and the second speaker 422 may use the inner space at the other side of the roller housing 401 as an acoustic resonance space.

Figure 11B:
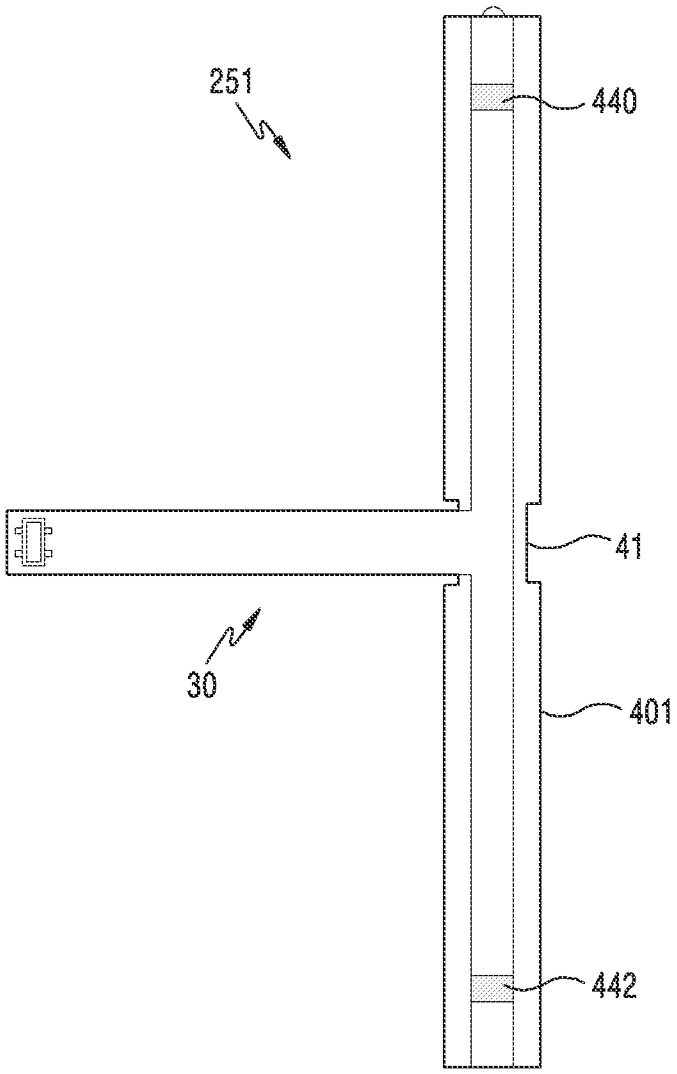

Referring to FIG. 11B, according to an embodiment, a first speaker 440 or a second speaker 442 arranged in a roller housing 401 of a roller 251 may be disposed at a place shifted closer to the midpoint (e.g., a groove 41) from each of the opposite ends of the roller housing 401 compared to the first speaker 420 or the second speaker 422 arranged as described in FIG. 11A. According to an embodiment, the first speaker 440 or the second speaker 442 may be at an optimal position after the arrangement position thereof is adjusted according to an audio tuning result.

Figure 11C:
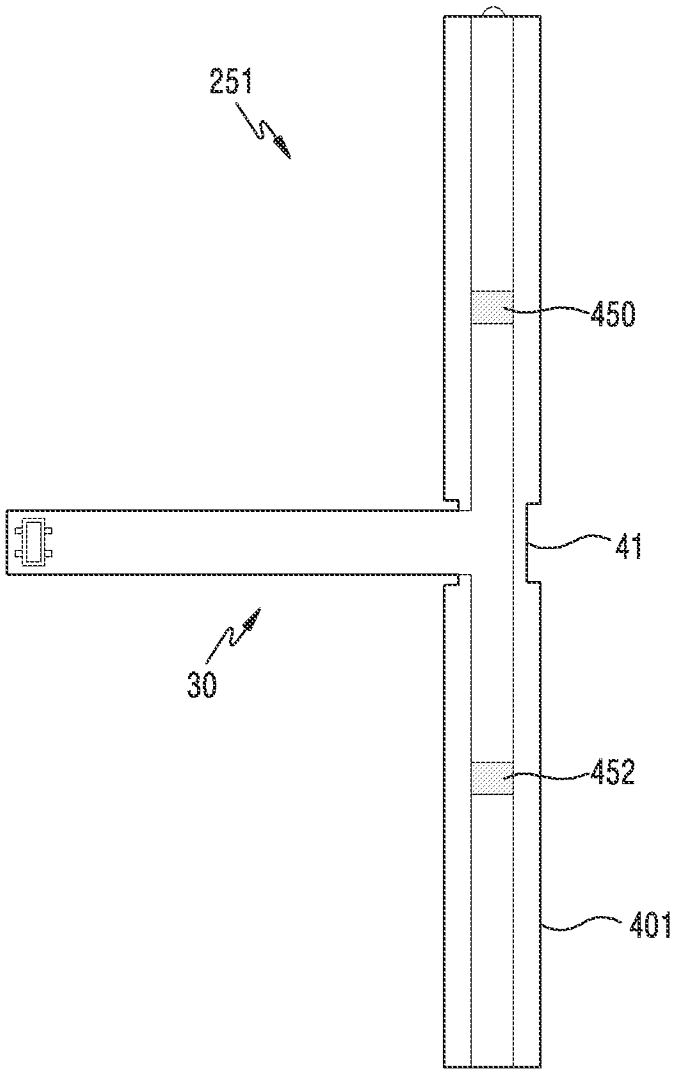

Referring to FIG. 11C, according to an embodiment, a first speaker 450 or a second speaker 452 arranged in a roller housing 401 of a roller 251 may be disposed at a place shifted closer to the midpoint from each of the opposite ends of the roller housing 401 compared to the first speaker 420 or the second speaker 422 arranged as described in FIG. 11B.

In an embodiment, the first speaker 450 may be disposed between one end and the middle portion of the roller housing 401, and the second speaker 452 may be disposed between the other end and the middle portion of the roller housing 401. The first speaker 420 or the second speaker 422 may, for example, be disposed close to the midpoint or far from the midpoint, and the arrangement thereof may be adjusted according to an audio tuning result.

Figure 11D:
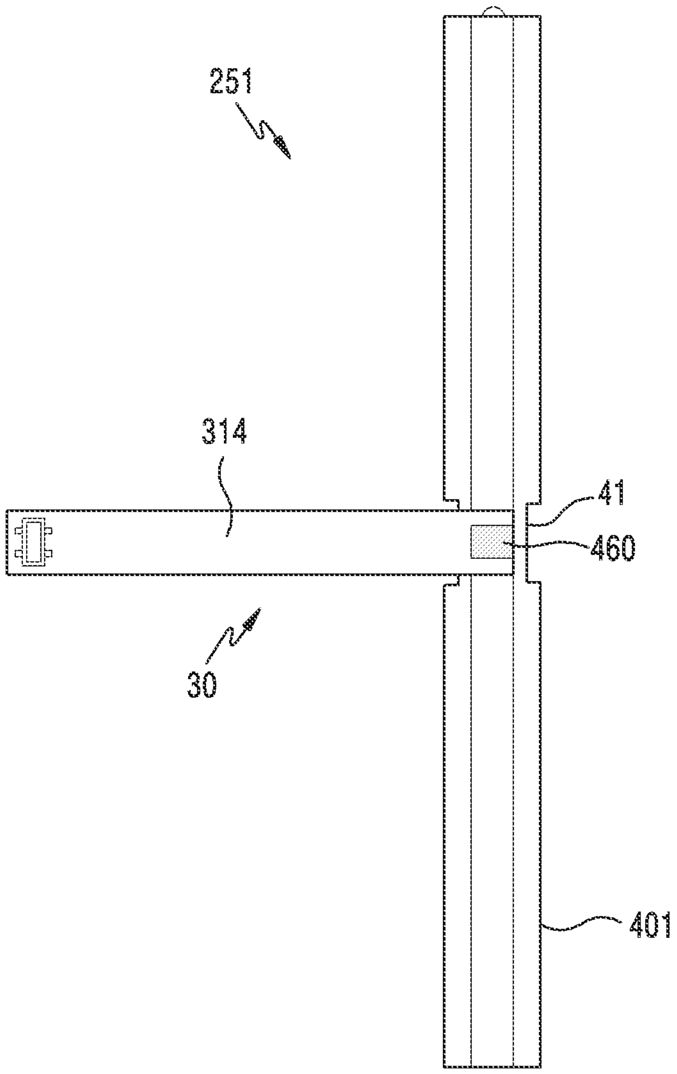

Referring to FIG. 11D, according to an embodiment, a speaker 460 may be disposed in a roller housing 401 of a roller 251. According to an embodiment, the speaker 460 may be disposed at the midpoint of the roller housing 401, and a first portion 310, 312 of a conductive connecting member 30 may be substantially omitted. For example, the speaker 460 may be disposed in the second portion 314 of the conductive connecting member 30. In another embodiment, the speaker 460 may be a unidirectional speaker configured to emit sound in one direction (e.g., the first direction ① or the second direction ②) or a bidirectional speaker configured to emit sound in two directions (e.g., the first direction ① and the second direction ②) According to still another embodiment, the speaker 460 may use an entire inner space of the roller housing 401 as an enclosure space and an acoustic resonance space.

Figure 12:
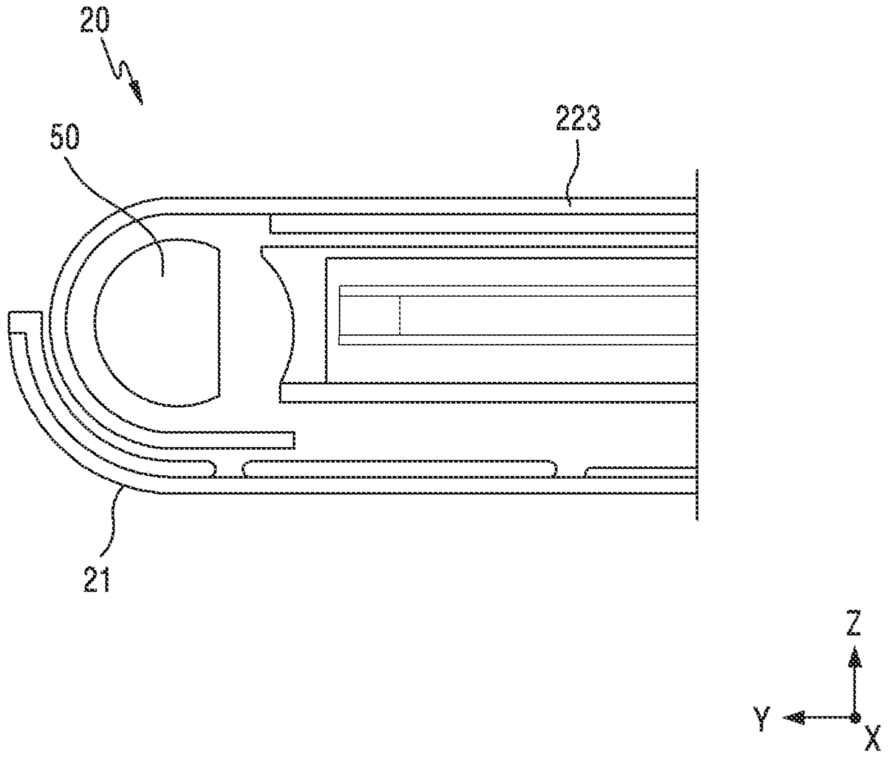
FIG. 12 is a schematic cross-sectional view of an electronic device in the slide-in state according to an embodiment of the disclosure.

FIG. 12 is a schematic cross-sectional view of an electronic device in the slide-in state according to an embodiment of the disclosure.

Referring to FIG. 12, an electronic device 20 according to an embodiment is different from the electronic device 20 illustrated in FIG. 4 only in the configuration of a guide member 50, and the other structures are substantially the same. Thus, the description of the other structures will be omitted to avoid redundant description.

The guide member 25 illustrated in FIG. 4 according to an embodiment includes the rotatable roller 251, but the guide member 50 illustrated in FIG. 12 may not include a rotating component. According to one embodiment, the guide member 50 may be fixed to the first housing 21 by a coupling structure (not illustrated). According to another embodiment, the guide member 50 may guide the movement of at least a portion of the flexible display 223. According to yet another embodiment, the flexible display 223 may be slid into or slid out of the first housing 21 by a driving source (not illustrated). According to still another embodiment, the flexible display may be guided in moving direction by the guide member 50 during sliding.

The guide member 50 may, for example, have either a cylindrical shape or a semi-cylindrical shape. In an embodiment, the guide member 50 may be disposed in the inner space in substantially the same manner as the speakers and the conductive connecting member 30 disposed in the roller 251 illustrated in FIGS. 7, 8, 9A, 9B, 10, and 11A to 11D. For example, since the guide member 50 does not rotate, structures for rotation such as the groove 41 in the guide member 25 may be omitted or configured differently. As another example, since the second portion 314 of the conductive connecting member 30, which is wound or unwound when the roller 251 rotates, is not wound or unwound in the embodiment of FIG. 12, the length or material of the second portion 314 may be implemented differently.

In an embodiment, an electronic device (e.g., the electronic device 20 illustrated in FIG. 2) may include a first housing (e.g., the first housing 21 illustrated in FIG. 2), a second housing (e.g., the second housing 22 illustrated in FIG. 2) including a circuit board (e.g., the circuit board 225 illustrated in FIG. 5) and configured to be slidable with respect to the first housing (e.g., the first housing 21 illustrated in FIG. 2), a display (e.g., the display 223 illustrated in FIG. 2) on which a partial area of the second housing (e.g., the second housing 22 illustrated in FIG. 2) is disposed, a guide member (e.g., the guide member 25 illustrated in FIG. 4) disposed in the first housing (e.g., the first housing 21 illustrated in FIG. 2) and configured to guide rolling of a partial area of the display (e.g., the display 223 illustrated in FIG. 2) in response to the sliding of the second housing (e.g., the second housing 22 illustrated in FIG. 2), one or more speakers (e.g., the speakers 420 and 422 illustrated in FIG. 9A) disposed inside the guide member (e.g., the guide member 25 illustrated in FIG. 4), and a conductive connecting member (e.g., the conductive connecting member 30 illustrated in FIG. 9B) disposed on the guide member (e.g., the guide member 25 illustrated in FIG. 4) to be wound or unwound and electrically connecting the speakers (e.g., the speakers 420 and 422 illustrated in FIG. 9A) to the circuit board (e.g., the circuit board 225 illustrated in FIG. 5).

In another embodiment, the guide member (e.g., the guide member 25 illustrated in FIG. 4) may be disposed at one end of the first housing (e.g., the first housing 21 illustrating in FIG. 2) to be rotatable about a rotary axis oriented in a direction perpendicular to the sliding direction of the second housing (e.g., the second housing 22 illustrated in FIG. 2).

In yet another embodiment, the guide member (e.g., the guide member 25 illustrated in FIG. 4) may include a roller (e.g., the roller 251 illustrated in FIG. 7), and the roller (e.g., the roller 251 illustrated in FIG. 7) may be disposed to be rotatable coaxially with the guide member (e.g., the guide member 25 illustrated in FIG. 4).

In still another embodiment, the roller (e.g., the roller 251 illustrated in FIG. 7) may be cylindrical.

According to one embodiment, the roller (e.g., the roller 251 illustrated in FIG. 7) may further include a cylindrical roller housing (e.g., the roller housing 401 illustrated in FIG. 7) including an enclosure space for the speakers (e.g., the speakers 420 and 422 illustrated in FIG. 9A).

According to another embodiment, the speakers (e.g., the speakers 420 and 422 illustrated in FIG. 9A) may include a first speaker (e.g., the speaker 420 illustrated in FIG. 9A) disposed in the cylindrical roller housing (e.g., the roller housing 401 illustrated in FIG. 7) to emit sound in a first direction oriented in the direction perpendicular to the sliding direction of the second housing (e.g., the second housing 22 illustrated in FIG. 2), and a second speaker (e.g., the speaker 422 illustrated in FIG. 9A) disposed in the cylindrical roller housing (e.g., the roller housing 401 illustrated in FIG. 7) opposite to the first speaker (e.g., the speaker 420 illustrated in FIG. 9A) and disposed to emit sound in a second direction opposite to the first direction.

According to yet another embodiment, the roller housing (e.g., the roller housing 401 illustrated in FIG. 7) may include a groove (e.g., the groove 41 illustrated in FIG. 8) recessed in the circumferential outer surface thereof such that the conductive connecting member (e.g., the conductive connecting member 30 illustrated in FIG. 9*b*) is wound to or unwound from the groove.

According to still another embodiment, the conductive connecting member (e.g., the conductive connecting member 30 illustrated in FIG. 9B) may include a first portion (e.g., the first portion 310, 312 illustrated in FIG. 9B) located inside the roller housing (e.g., the roller housing 401 illustrated in FIG. 7); and a second portion (e.g., the first portion 314 illustrated in FIG. 9B) branched from the first portion (e.g., the first portion 310, 312 illustrated in FIG. 9B) and located outside the roller housing (e.g., the roller housing 401 illustrated in FIG. 7) to be wound to or unwound from the groove (e.g., the groove 41 illustrated in FIG. 8)

The conductive connecting member (e.g., the conductive connecting member 30 illustrated in FIG. 9B) includes three connectors (e.g., the connectors 311, 313, and 315 illustrated in FIG. 9B). The three connectors may include a first connector (e.g., the first connector 311 illustrated in FIG. 9B) disposed at one end of the first portion (e.g., the first portion 310, 312 illustrated in FIG. 9B) and connected to the first speaker (e.g., the first speaker 420 illustrated in FIG. 9A), a second connector (e.g., the second connector 313 illustrated in FIG. 9B) disposed at the other end of the first portion (e.g., the first portion 310, 312 illustrated in FIG. 9B) and connected to the second speaker (e.g., the speaker 422 illustrated in FIG. 9A), and a third connector (e.g., the third connector 315 illustrated in FIG. 9B) disposed at an end of the second portion (e.g., the first portion 314 illustrated in FIG. 9B) and connected to the circuit board (e.g., the circuit board 225 illustrated in FIG. 5).

In an embodiment, the speakers (e.g., the speakers 420 and 422 illustrated in FIG. 9A) may be configured to use the inner space of the guide member (e.g., the guide member 25 illustrated in FIG. 4) as an enclosure acoustic resonance section.

In another embodiment, the second housing (e.g., the second housing 22 illustrated in FIG. 2) may be in a slide-in or slide-out state along the longitudinal direction of the first housing (e.g., the first housing 21 illustrated in FIG. 2).

In yet another embodiment, the roller housing (e.g., the roller housing 401 illustrated in FIG. 7) may include a sound absorbing material (e.g., the sound absorbing material 43 illustrated in FIG. 10) in the inner space.

According to still another embodiment, an electronic device (e.g., the electronic device 20 illustrated in FIG. 2) may include a housing; a driver disposed in the housing; and one or more speakers (e.g., the speakers 420 and 422 illustrated in FIG. 9A) that are coaxially disposed within the driver and configured to use an inner space of the driver as an enclosure acoustic resonance space.

The driver may be a rolling driver, and the rolling driver may include a roller (e.g., the roller 251 illustrated in FIG. 7), the roller (e.g., the roller 251 illustrated in FIG. 7) may further include a cylindrical roller housing (e.g., the roller housing 401 illustrated in FIG. 7) including an enclosure space for the speakers (e.g., the speakers 420 and 422 illustrated in FIG. 7), and the speakers (e.g., the speakers 420 and 422 illustrated in FIG. 9A) may be disposed in the cylindrical roller housing (e.g., the roller housing 401 illustrated in FIG. 7).

In an embodiment, the speakers (e.g., the speakers 420 and 422 illustrated in FIG. 9A) may include a first speaker (e.g., the speaker 420 illustrated in FIG. 9A) disposed in the cylindrical roller housing (e.g., the roller housing 401 illustrated in FIG. 7) to emit sound in a first direction oriented in the direction perpendicular to the sliding direction of the second housing (e.g., the second housing 22 illustrated in FIG. 2), and a second speaker (e.g., the speaker 422 illustrated in FIG. 9A) disposed in the cylindrical roller housing (e.g., the roller housing 401 illustrated in FIG. 7) opposite to the first speaker (e.g., the speaker 420 illustrated in FIG. 9A) and disposed to emit sound in a second direction opposite to the first direction.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

a first housing;

a second housing comprising a circuit board and configured to be slidable with respect to the first housing;

a display on which a partial area of the second housing is disposed;

a multi-bar support supporting at least part of the display;

a third housing comprising an inner space and configured to support a movement of the multi-bar support in response to a sliding of the second housing;

a speaker disposed inside the third housing; and a conductive connecting member disposed on the third housing to be wound or unwound and electrically connecting the speaker to the circuit board, wherein the conductive connecting member is connected to the circuit board of the second housing and configured to be slidable together with the second housing.

2. The electronic device of claim 1, wherein the third housing is disposed at end of the first housing such that the at least part of the display rotate about a rotary axis oriented in a direction perpendicular to a sliding direction of the second housing.

3. The electronic device of claim 2, wherein the third housing comprises a roller, and wherein the roller is disposed to be rotatable coaxially with the third housing.

4. The electronic device of claim 3, wherein the roller is cylindrical.

5. The electronic device of claim 4, wherein the third housing further comprises an enclosure space for the speaker in the inner space.

6. The electronic device of claim 1, wherein the speaker disposed in the third housing and disposed to emit sound in a first direction oriented in a direction perpendicular to a sliding direction of the second housing, and wherein the third housing further comprises an another speaker disposed in the third housing opposite to a first speaker and disposed to emit sound in a second direction opposite to the first direction.

7. The electronic device of claim 5, wherein the third housing further comprises a groove recessed in an outer circumferential surface thereof such that the conductive connecting member is wound to or unwound from the groove.

8. The electronic device of claim 7, wherein the conductive connecting member comprises:

a first portion located inside the third housing; and a second portion branched from the first portion and located outside the third housing to be wound to or unwound from the groove.

9. The electronic device of claim 8, wherein the conductive connecting member comprises three connectors comprising:

a first connector disposed at one end of the first portion and connected to the speaker;

a second connector disposed at the other end of the first portion and connected to an another speaker; and a third connector disposed at an end of the second portion and connected to the circuit board.

10. The electronic device of claim 1, wherein the speaker is configured to use the inner space of the third housing as an enclosure acoustic resonance section.

11. The electronic device of claim 1, wherein the second housing is configured to slide in or out along a longitudinal direction of the first housing.

12. The electronic device of claim 5, wherein the third housing comprises a sound absorbing material in the inner space.

13. An electronic device comprising:

a housing comprising a first housing and a second housing configured to be slidable with respect to the first housing;

a flexible display at least disposed in the second housing;

a driver disposed in the first housing and comprising a roller;

one or more speakers coaxially disposed within the driver roller and configured to use an inner space of the roller as an enclosure acoustic resonance space; and a conductive connecting member disposed on the roller to be wound or unwound and electrically connecting the speakers to a circuit board disposed in the second housing, wherein the inner space is sealed by a sealing structure such that the inner space is used as an enclosure space for one or more speakers, and wherein the conductive connecting member is connected to the circuit board of the second housing and configured to be slidable together with the second housing.

14. The electronic device of claim 13, wherein the roller comprises a cylindrical roller housing comprising the enclosure space for the speakers, and wherein the speakers are disposed in the cylindrical roller housing.

15. The electronic device of claim 14, wherein the speakers comprise:

a first speaker disposed in the cylindrical roller housing and disposed to emit sound in a first direction oriented in a direction perpendicular to a sliding direction of the second housing, and a second speaker disposed in the cylindrical roller housing opposite to the first speaker and disposed to emit sound in a second direction opposite to the first direction.

* * * * *